Patented Feb. 17, 1948

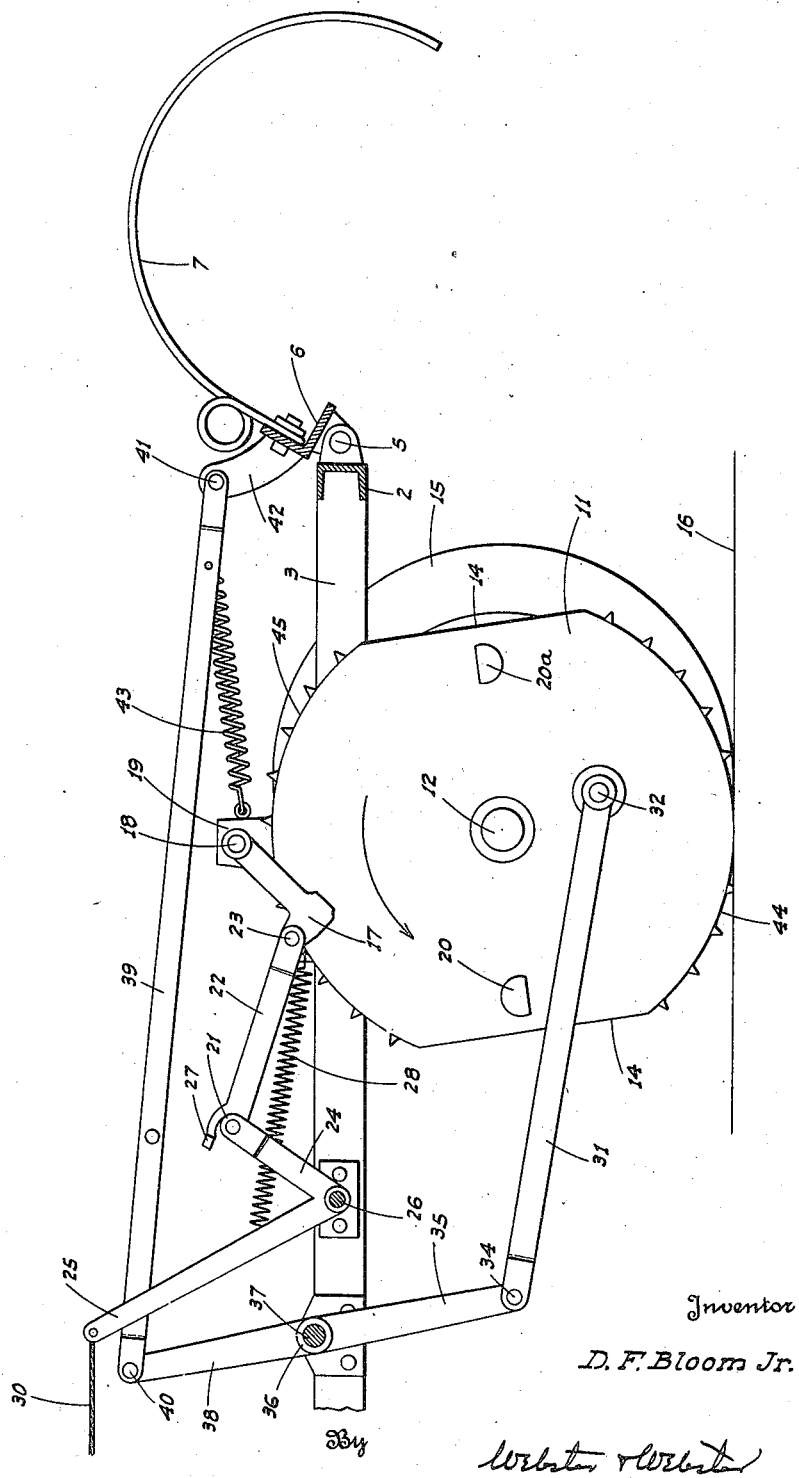

2,436,245

UNITED STATES PATENT OFFICE 2,436,245

RAKE ACTUATING MECHANISM

Dennis F. Bloom, Jr., West Sacramento, Calif.

Application June 26, 1944, Serial No. 542,112

15 Claims. (Cl. 56—386)

This invention relates generally to hay rakes, and is directed particularly to a novel mechanism for actuating the vertically movable rake assembly thereof.

One object of the present invention is to embody, in a hay rake having a main frame and a vertically swingable rake assembly mounted thereon, a mechanism arranged to function upon advance of the implement and release of a manually controlled trip, to mechanically raise and to control lowering of said rake assembly.

Another object of the invention is to provide a rake actuating mechanism, as above, wherein said mechanism includes a rotary member adapted to engage and be driven by the ground so as to impart rake actuating movement to the remainder of said mechanism; such rotary member normally being clear of the ground, as is desirable.

A further object of the invention is to provide a rake actuating mechanism which is smooth and yet rapid in operation.

An additional object is to provide a rake actuating mechanism which is manually controlled by a releasable self-setting trip; said trip being arranged to release the mechanism to cause lifting and immediate lowering of the rake assembly, or lifting and locking thereof in raised position, selectively.

A further object is to provide a rake control mechanism which will not only positively lift the rake teeth, but will also forcefully and positively, yet smoothly, lower the teeth. This avoids relying on gravity, as is now the case, and which may either allow the teeth to hang up, or cause them to hit the ground with a severe jar, tending to loosen up the parts.

A further object of the invention is to provide a simple, inexpensive, and practical device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a similar view but illustrates the rake actuating mechanism in operation.

Figure 1:
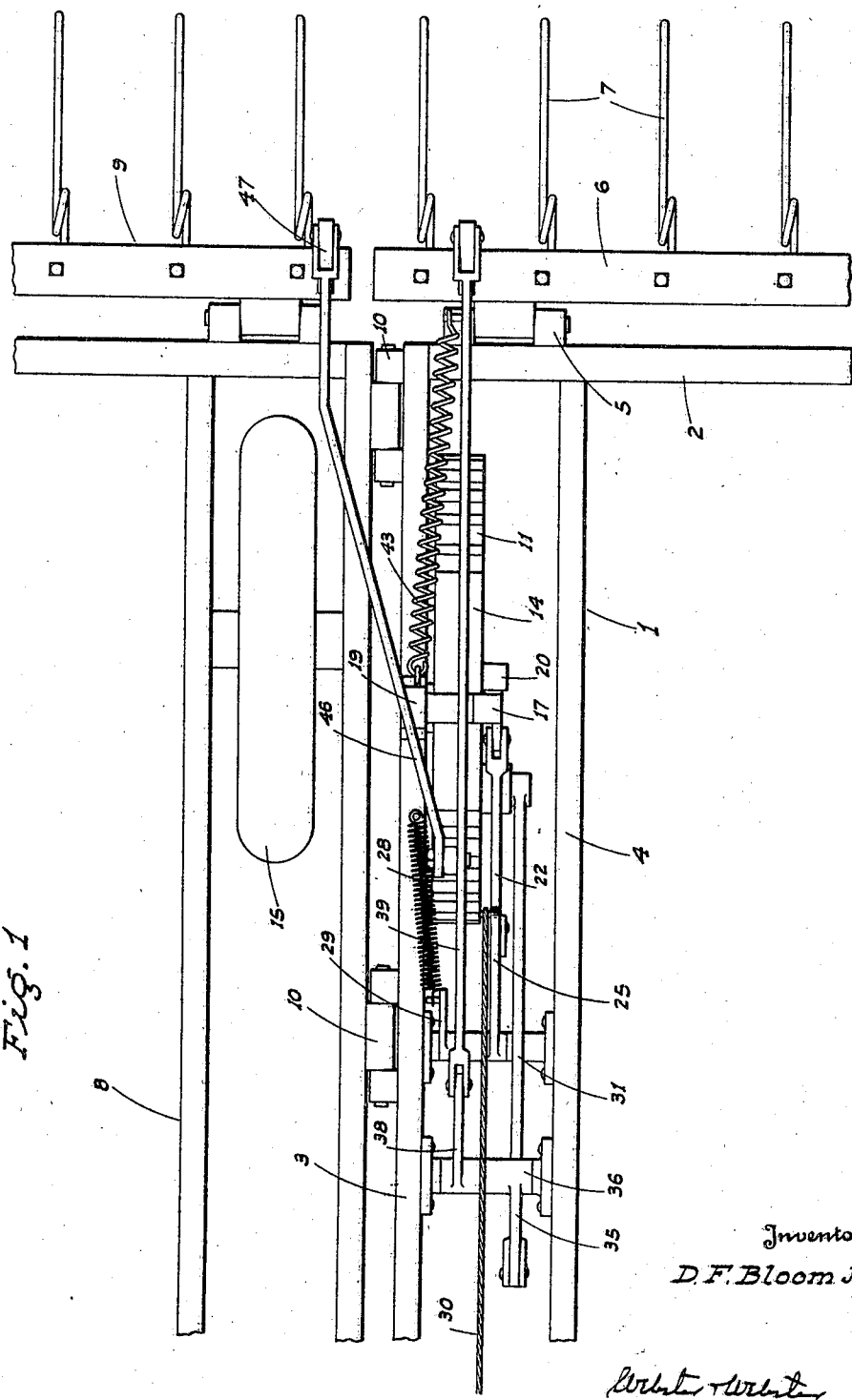
Figure 1 is a fragmentary plan view of a hay rake, illustrating the rake actuating mechanism mounted thereon.
Figure 2:
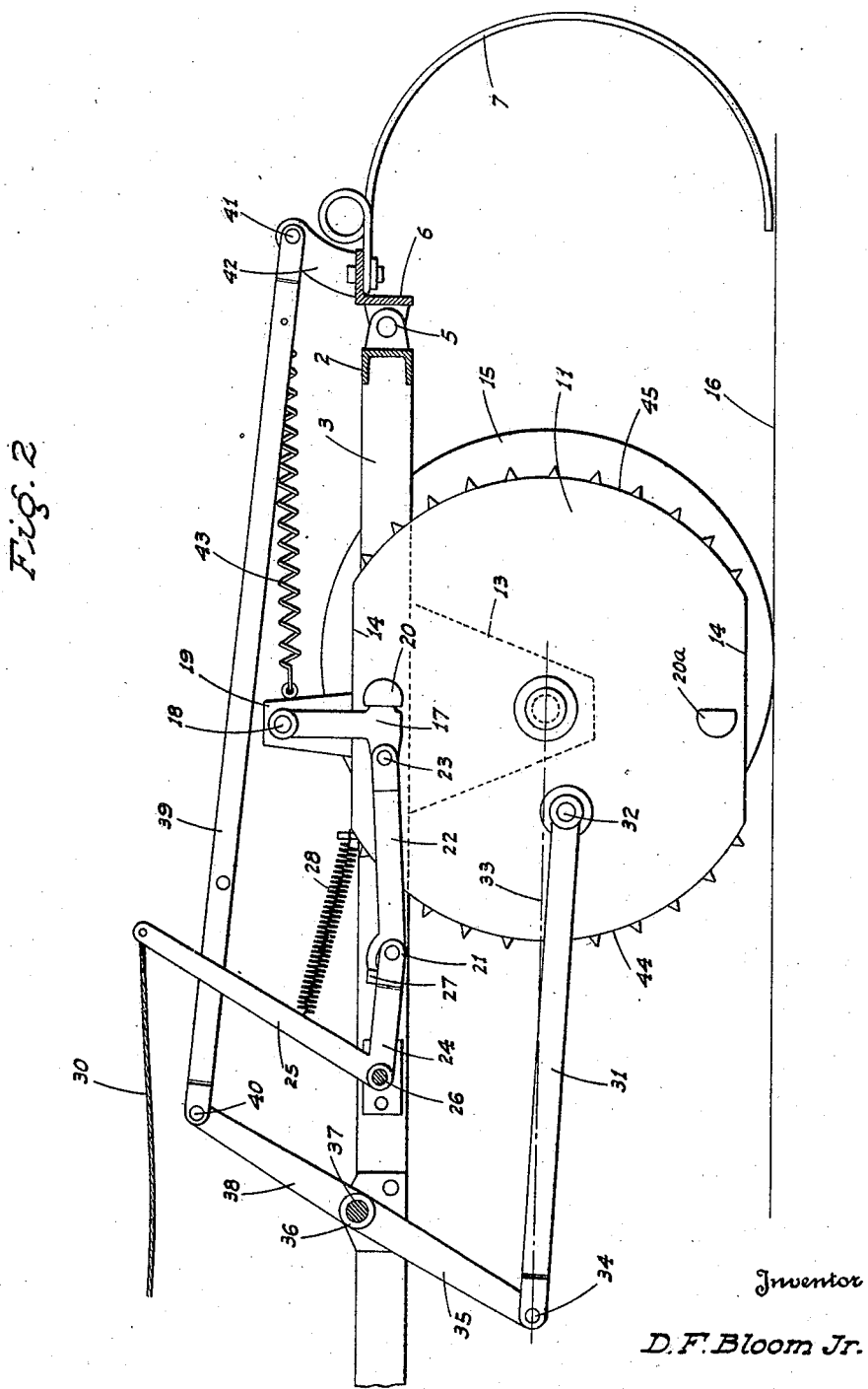
Figure 2 is a longitudinal sectional elevation of the rake actuating mechanism in inactive position, with the rake in ground engagement.

Referring now more particularly to the characters of reference on the drawings, the rake actuating mechanism is adapted to be embodied in connection with a hay rake which includes a main frame section, indicated generally at 1, which includes a rear transversely extending beam 2 and a pair of parallel longitudinally extending beams 3 and 4 disposed in adjacent but spaced relation. The rear beam 2 hingedly supports, by means shown in part at 5, a vertically movable or swingable rake assembly which includes a transversely extending rake bar 6 which is parallel to rear beam 2, and from which rake bar conventional arcuate rake teeth 7 depend.

The hay rake frame structure in the present disclosure is of the type wherein the rake includes another main frame section indicated here at 8, which likewise supports a vertically swingable rake assembly, indicated generally at 9 also see Figure 4. In this type of frame structure, the main frame sections 1 and 8 are hinged together, as at 10, for upward folding movement to upstanding position of the frame section 1 whereby to reduce the overall width of the implement for transport.

The rake actuating mechanism to which the present invention is directed comprises the following:

A drive wheel 11 is journaled on a transverse spindle or axle 12 carried by a dependent bracket 13 fixed in connection with the longitudinal beam 3 adjacent but somewhat ahead of the rear beam 2. The drive wheel 11 has opposed chordal portions cut away whereby to provide flat parallel faces 14 at the periphery of said wheel on opposite sides of the axis 12 of the latter. The main frame structure is supported a predetermined and substantially constant distance above the ground by wheel 15. The drive wheel, when in its normal or inactive position, is disposed with the faces 14 horizontal, and such wheel is of a diameter so that the lowermost one of said faces 14 is then adjacent but clear of the ground line 16.

The drive wheel 11 is normally held against clockwise rotative movement by means of a trip lever 17 pivotally mounted at its upper end, as at 18, in connection with a rigid ear 19 which upstands from longitudinal beam 3. The trip lever 17 depends alongside the drive wheel 11 and engages with one of a pair of stops 20 and 20a which are fixed on and project laterally out from the drive wheel 11 adjacent corresponding faces 14 and in alinement diametrally of said wheel.

Swinging movement of the trip lever 17 is normally prevented by means of a longitudinally extending toggle link unit, indicated generally at 21, one link 22 of said unit being pivotally connected as at 23 with the lower end portion of the trip lever 17; the other link 24 of the toggle link unit 21 comprising a rearwardly extending leg of a bellcrank 25 pivoted intermediate its ends on a cross shaft 26. The toggle link unit 21 is normally slightly below dead-center and is held against further downward breaking movement by means of a stop 27 on link 22 engaging link 24. A tension spring 28 connects between an upstanding lever 29 rigid with bellcrank 25, and a rearward point on the longitudinal beam 3; such spring normally holding the bellcrank 25 in position to maintain the locked condition of toggle link unit 21. A pull rope 30 leads from the upper end of bellcrank 25 forwardly to the tractor to which the hay rake is connected in draft relation.

A connecting rod 31 is pivoted in connection with the drive wheel 11, as at 32, with such pivot point being radially offset relative to the spindle 12 and normally slightly below the horizontal center line 33 of the latter. From the pivot 32 the connecting rod 31 extends forwardly to pivotal connection, as at 34, with a dependent lever 35 fixed on a sleeve 36 rotatable on a cross-shaft 37 which extends between the longitudinal beams 3 and 4.

Another lever 38 is fixed on said sleeve 36 and upstands therefrom in opposed relation to the lever 35; the levers 35 and 38 forming what may be termed a swing lever unit.

A pull link 39 is pivotally connected at its forward end, as at 40, to the upper end of lever 38, and is pivotally connected at its rear end, as at 41, to a rigid upstanding arm 42 fixed on the rake bar 6 of the rake assembly. A heavy-duty tension spring 43 is connected, in counterbalancing relation to the rake assembly, between the upstanding arm 42 and the ear 18 on longitudinal beam 3.

In operation of the above described rake actuating mechanism, the rake teeth 7 are normally in ground engagement, whereby to pick up hay with advance of the implement; the wheel 11 then being clear of the ground and inactive. When the operator desires to raise the rake assembly to release the hay therefrom he merely pulls on rope 30 which breaks the toggle link 21 upwardly and swings trip lever 17 clear of the engaged stop 20. When this occurs, the tendency of the rake teeth to raise the rake assembly with forward movement of the implement imparts a certain forward movement to the pull link 39 and a resultant rearward movement to the connecting rod 31. As the connecting rod 31 is pivoted, as at 32, below center line 33, such rearward movement of said rod causes initial anti-clockwise rotation of the drive wheel 11. The circular peripheral portions 44 and 45 of the drive wheel are spiked, as shown, and as the circular portion 44 is advanced into ground engagement by the connecting rod 31 the drive wheel is then rotated anti-clockwise from the ground, and forcefully, as a result of continued advancing movement of the implement. This forceful rotative movement is then transmitted back through connecting rod 31, the swing lever unit, and pull link 39, causing raising movement of the rake assembly, as illustrated in Fig. 3.

If the operator desires the rake assembly to remain in raised position he releases the pull rope 30 immediately after the initial tripping operation, whereby the following stop 20a, which was initially at the bottom of the wheel, will engage the trip lever 17, which has already returned to its holding position.

However, if the operator desires the rake assembly to raise, and then return to its initial or starting position in ground engagement, he continues the pull on rope 30 until the initially lowermost stop 20a has passed the holding point of trip lever 17, whereupon the pull rope 30 is released, permitting the bellcrank 25 and the toggle link unit 21 to return to normal position. This returns the trip lever 17 to holding position so as to engage the initially uppermost stop 20, which stops the drive wheel 11 in its starting position.

Momentum, coupled with the tendency of the rake assembly to fall, assures that the drive wheel 11 will continue to rotate after the circular portion 44 escapes the ground at its trailing end and until the leading end of the circular portion 45 engages the ground to continue rotation of said wheel.

The separate rake assembly 9 is actuated by an auxiliary pull link 46 which extends diagonally from the pull link 39 adjacent the forward end of the latter to pivotal connection with an upstanding arm 47 on said rake assembly 9. The auxiliary pull link 46 is of course removed should it be desired to swing the frame sections 1 and 8 on the hinges 10.

It will also be seen that by reason of the positive connection between the ground engaging non-slip drive wheel and the hinged rake bar, said bar and the rake teeth thereon will be positively and smoothly returned to the ground after being lifted, and at a gradual speed so that no severe jar is had either at the start or finish of the rake movement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rake actuating mechanism for a hay rake which includes a main frame disposed above and supported for movement along the ground, and a rake assembly mounted on said main frame for up and down swinging movement, said actuating mechanism comprising a movable member connected to said rake assembly to lift the same, drive means operative to move said member in a direction to lift the rake assembly, said drive means being driven by ground engagement but normally disposed in direct ground clearing relation, and manually controlled means to cause ground engagement of said drive means.

2. A rake actuating mechanism for a hay rake which includes a main frame disposed above and supported for movement along the ground, and a rake assembly mounted on said main frame for up and down swinging movement, said actuating mechanism comprising a member movable in one direction to lift the rake assembly and movable in the other direction to lower the same, drive means coupled to said member operative to recurringly move said member in said one direction and then in the other, said drive means being normally inactive, and manually controlled means to place the drive means in operation.

3. A rake actuating mechanism for a hay rake which includes a main frame disposed above and supported for movement along the ground, and a rake assembly mounted on said main frame for up and down swinging movement, said actuating mechanism comprising a member movable in one direction to lift the rake assembly and movable in the other direction to lower the same, drive means coupled to said member operative to recurringly move said member in said one direction and then in the other, said drive means being normally inactive, and manually controlled means to place the drive means in operation; said manually controlled means being operable to interrupt the operation of the drive means at the end of either movement of said member.

4. A rake actuating mechanism for a hay rake which includes a main frame disposed above and supported for movement along the ground, and a rake assembly mounted on said main frame for up and down swinging movement, said actuating mechanism comprising a link connected to the rake assembly, said link being reciprocable to raise and lower said rake assembly, a wheel mounted on the main frame, said wheel being normally out of engagement with the ground, drive connections between said wheel and link arranged to reciprocate the link upon rotation of the wheel, and manually controlled means to place said wheel in ground driven operation, and to subsequently terminate said operation.

5. A rake actuating mechanism for a hay rake which includes a main frame disposed above and supported for movement along the ground, and a rake assembly mounted on said main frame for up and down swinging movement about a transverse axis, a rigid member upstanding from the rake assembly, a link pivotally connected to and extending forward from said member, a drive wheel mounted on the main frame adapted to engage and be driven from the ground, connections between said wheel and link arranged to reciprocate the latter upon rotation of said wheel, and manually controlled releasable means normally preventing rotation of the wheel.

6. A rake actuating mechanism for a hay rake which includes a main frame disposed above and supported for movement along the ground, and a rake assembly mounted on said main frame for up and down swinging movement about a transverse axis, a rigid member upstanding from the rake assembly, a link pivotally connected to and extending forward from said member, a drive wheel mounted on the main frame adapted to engage and be driven from the ground, connections between said wheel and link arranged to reciprocate the latter upon rotation of said wheel, and manually controlled releasable means normally preventing rotation of the wheel; said last named means including a stop on the wheel, a trip against which said stop is adapted to engage, and a toggle link unit normally holding the trip in position to engage the stop, said toggle link unit when released causing the trip to move out of the path of said stop.

7. A structure as in claim 6 in which one link of said toggle link unit is the leg of a bellcrank lever, the other leg extending upward, a pull element leading forward from said other leg whereby a pull on said element releases the toggle link unit, and a spring connected to said bellcrank lever to reset the toggle link unit to holding position.

8. A rake actuating mechanism for a hay rake which includes a main frame disposed above and supported for movement along the ground, and a rake assembly mounted on said main frame for up and down swinging movement about a transverse axis, a rigid member upstanding from the rake assembly, a link pivotally connected to and extending forward from said member, a drive wheel mounted on the main frame adapted to engage and be driven from the ground, said drive wheel having a peripheral portion of reduced radius relative to adjacent peripheral portions adapted for ground engagement to rotate the wheel, said reduced radius portion normally being lowermost and clear of the ground, a manually releasable trip normally preventing rotation of the wheel, and connections between the wheel and link arranged to reciprocate the latter upon rotation of the wheel.

9. A rake actuating mechanism for a hay rake which includes a main frame disposed above and supported for movement along the ground, and a rake assembly mounted on said main frame for up and down swinging movement about a transverse axis, a rigid member upstanding from the rake assembly, a link pivotally connected to and extending forward from said member, a drive wheel mounted on the main frame adapted to engage and be driven from the ground, said drive wheel having a peripheral portion of reduced radius relative to adjacent peripheral portions adapted for ground engagement to rotate the wheel, said reduced radius portion normally being lowermost and clear of the ground, a manually releasable trip normally preventing rotation of the wheel, and connections between the wheel and link arranged to reciprocate the latter upon rotation of the wheel; said connections including a connecting rod pivoted to the wheel and projecting forwardly therefrom, the pivot point of the rod on the wheel normally being disposed ahead of the wheel axis and below the horizontal center line thereof, and a pivotally mounted swing lever unit connected in pivotal relation between adjacent ends of said link and connecting rod.

10. A structure as in claim 8 in which the wheel includes another peripheral portion of reduced radius; said manually releasable trip being arranged to prevent rotation of the wheel when either of said reduced radius peripheral portions are lowermost on the wheel and clear of the ground.

11. A structure as in claim 8 in which said trip includes a pivotally mounted trip lever, a stop on the wheel, the trip lever being swingable from a position in the path of the stop to a point clear thereof, a toggle link unit connected to the trip lever and normally holding the latter in the path of the stop, and means to release the toggle link unit and to thus swing the trip lever clear of said stop; said toggle link unit being self-resetting to holding position.

12. A rake actuating mechanism for a hay rake which includes a main frame disposed above and supported for movement along the ground, and a rake assembly mounted on said main frame for up and down swinging movement about a transverse axis, a rigid member upstanding from the rake assembly, a link pivotally connected to and extending forward from said member, a drive wheel mounted on the main frame adapted to engage and be driven from the ground, said drive wheel having a peripheral portion of reduced radius relative to adjacent peripheral portions adapted for ground engagement to rotate the wheel, said reduced radius portion normally being lowermost and clear of the ground, a manually releasable trip normally preventing rotation of the wheel, a connecting rod pivoted to the wheel and projecting forwardly therefrom, the pivot point of the rod on the wheel normally being disposed ahead of the wheel axis and below the horizontal center line thereof, and an upstanding lever unit pivoted intermediate its ends on the main frame, the connecting rod being pivoted at its forward end to the lever end of said lever unit, and the link being pivoted at its forward end to the upper end of said lever unit.

13. A rake actuating mechanism for a hay rake which includes a main frame disposed above and supported for movement along the ground, and a rake assembly mounted on said main frame for up and down swinging movement about a transverse axis, a rigid member upstanding from the rake assembly, a link pivotally connected to and extending forward from said member, a drive wheel mounted on the main frame adapted to engage and be driven from the ground, said wheel having opposed peripheral portions of reduced radius relative to adjacent peripheral portions adapted to engage the ground and drive the wheel, one of said reduced radius peripheral portions normally being lowermost on the wheel and clear of the ground, opposed stops on the wheel corresponding to said reduced radius peripheral portions, a trip against which one of said stops normally engages to prevent rotation of the wheel, manually controlled means to release said trip, the latter being self-resetting in stop engaging position, a connecting rod pivoted to the wheel and projecting forwardly therefrom, the pivot point of the rod on the wheel normally being disposed ahead of the wheel axis and below the horizontal center line thereof, and an upstanding lever unit pivoted intermediate its ends on the main frame, the connecting rod being pivoted at its forward end to the lever end of said lever unit, and the link being pivoted at its forward end to the upper end of said lever unit.

14. A structure as in claim 8 in which the ground engaging portions of the periphery of the wheel are provided with traction elements.

15. Hay rake mechanism comprising a vehicle which includes a wheel supported main frame, a rake carrying frame pivotally mounted on the main frame for swinging movement in a vertical plane, a link pivoted on the rake frame above its pivotal connection and extending forwardly over the main frame, a drive wheel separate from the supporting wheels on the main frame and which drive wheel is journalled on the main frame for rotary movement, such drive wheel having opposed chordal sections cut away to provide flat parallel faces on opposite sides of the wheel, such faces being normally positioned in horizontal planes, the diameter of the drive wheel being such that such drive wheel does not then engage the ground but the curved peripheral portions of the wheel being engageable with the ground upon rotation of the wheel, a vertical lever fulcrumed on the main frame, the upper end of said lever being pivotally connected to said forwardly extending link, a second link, one end of such second link being pivotally connected with the lower end of said lever and the other end of such second link being pivotally connected with the face of the drive wheel at a point below the journal point of the latter when it is in such normal inactive position, means to hold said drive wheel in such normal inactive position, means to release such holding means, the pressure of any hay against the rake then functioning through the links and lever to turn the drive wheel forwardly to bring the curved peripheral portion thereof into contact with the ground, whereupon with the forward movement of the vehicle the frictional resistance of the wheel with the ground will rotate the wheel and function through the links and lever to reciprocate the rake frame in a vertical plane.

DENNIS F. BLOOM, Jr.

REFERENCES CITED

The following references are of record in the file of this patent:

UNITED STATES PATENTS

| Number | Name | Date |
|---|---|---|
| 923,728 | Swern | June 1, 1909 |

FOREIGN PATENTS

| Number | Country | Date |
|---|---|---|
| 62,538 | Austria | Dec. 10, 1913 |